United States Patent [19]

Mizuno et al.

[11] Patent Number: 4,635,501
[45] Date of Patent: Jan. 13, 1987

[54] GEARS WITH DAMPED VIBRATION

[75] Inventors: Keiichiro Mizuno; Kazuyoshi Iida; Kazutomo Murakami, all of Yokohama, Japan

[73] Assignee: Bridgestone Corporation, Tokyo, Japan

[21] Appl. No.: 614,918

[22] Filed: May 29, 1984

[30] Foreign Application Priority Data

Aug. 19, 1983 [JP] Japan .................................. 58-150278

[51] Int. Cl.$^4$ .............................................. F16F 15/10
[52] U.S. Cl. .................................... 74/574; 74/434; 74/DIG. 4
[58] Field of Search ........... 74/434, 421, 574, DIG. 4; 310/74

[56] References Cited

U.S. PATENT DOCUMENTS

| 2,605,132 | 7/1952 | Watter .................................. 74/443 |
| 3,307,419 | 3/1967 | Brickett et al. ...................... 74/443 |
| 3,545,301 | 12/1970 | Richter ................................ 310/74 |
| 3,610,066 | 11/1969 | Rychlik ............................... 74/434 |
| 3,790,831 | 2/1974 | Morreale ............................. 310/74 |
| 3,857,296 | 12/1974 | Tsundo ............................... 74/443 |
| 4,049,985 | 9/1977 | Sudler ................................. 310/74 |

FOREIGN PATENT DOCUMENTS 2086528 5/1982 United Kingdom .................. 74/443

Primary Examiner—Lawrence Staab
Attorney, Agent, or Firm—Jordan and Hamburg

[57] ABSTRACT

Gear made of magnetic material is attached with permanent magnet on the web thereof for damping vibration and noise caused when gears are in operation.

8 Claims, 17 Drawing Figures

FIG. 5
FIG. 6
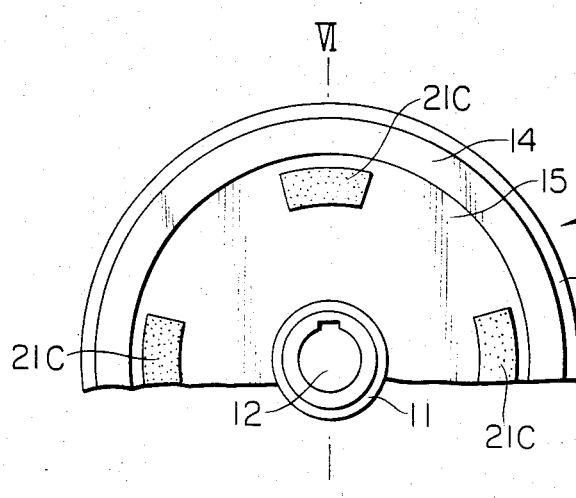
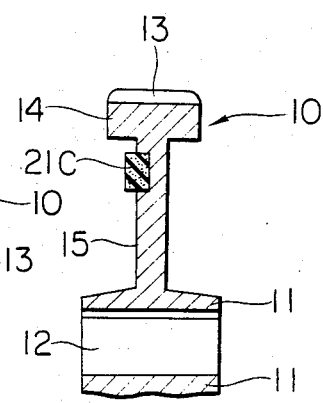
FIG. 7
FIG. 8
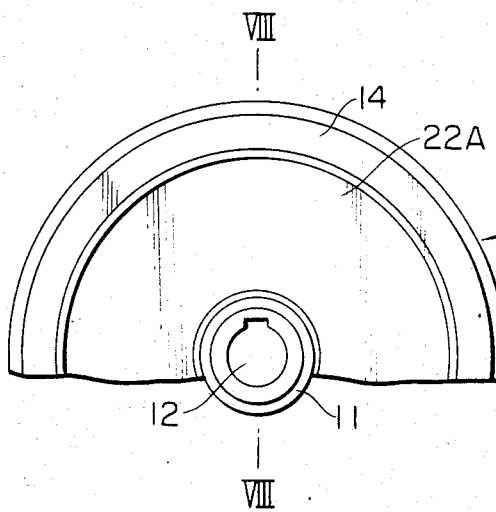
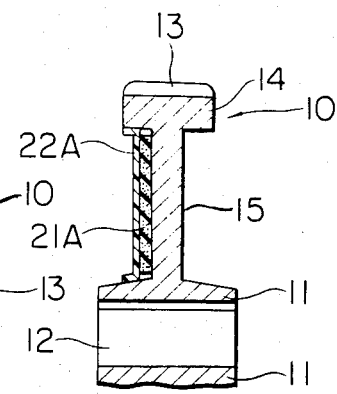

GEARS WITH DAMPED VIBRATION

BACKGROUND OF THE INVENTION

This invention relates to torque transmitting mechanical elements, above all gears adapted to damp or reduce vibration thereof in operation and reduce noise generated therefrom.

It is well known that when such mechanical elements usually made of hard or rigid metal such as iron are respectively rotated to transmit driving power from one to the other they are often vibrated to generate undesired noise particularly when running at high speed.

In order to reduce noise, gears of soft or flexible material such as artificial resin have been proposed and actually used in some field. Such so-called plastic gears, however, are not satisfactory due to that when too highly loaded the gear teeth often slip over which not only makes driving unreliable but also often causes dangerous situation above all when in high speed operation.

In order to damp such vibration or "hammering" and noise, U.S. Pat. No. 3,834,248 discloses a gear adapted to receive oil under pressure via the shaft having the oil conduit formed therein so as to maintain a film of oil on the torque transmitting teeth. This is, however, naturally disadvantageous from the economical view point.

It has been proposed to fix a piece, ring and the like of elastomer on the gears. This is preferable in view point of the cost, but found unsatisfactory in that thickness or volume of such damping material must be considerably large and that when gears are arranged in the box filled with lubricant oil or supplied with much amount of oil applied such material is deteriorated.

SUMMARY OF THE INVENTION

Having sought for any other simple and low cost means for effectively damping such vibration and reducing noise of rotating gears, the inventors found that when attaching a permanent magnet plate on the side or web of the gear made of magnetic material, unexpectedly such vibration is considerably damped so as to consequently reduce noise.

It has not yet been possible to definitely explain the reason, but the inventors guess that the permanent magnet magnetically attached to the rotating gear slightly slip on the gear web and vibrate relative thereto so as to play some role resembling said damping elastomer.

It is the object, thus, of the invention to provide simple and low cost means for damping vibration and reducing noise of gears.

It is the other object to provide such means readily applied to the gears having been already formed and actually used.

The other objects and advantages will be appreciated by understanding the following explanation made in conjunction with the accompanying drawings.

DESCRIPTION OF THE PREFERRED EMBODIMENT

Figure 1:
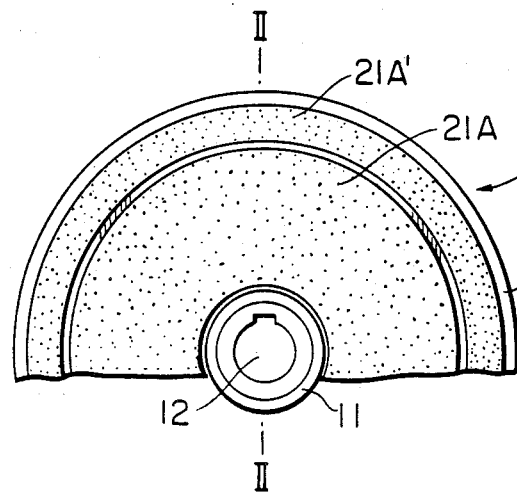
FIGS. 1 and 2 are respectively a fragmentary elevation and a corresponding sectional view taken along a line II—II shown in the former for illustrating a manner of attaching magnet on the gear web according to the invention, FIGS. 3, 4; 5, 6; 7, 8; 9, 10 and 11, 12 are respectively similar pair of views for showing various manners of attachment of the magnet.
Figure 2:
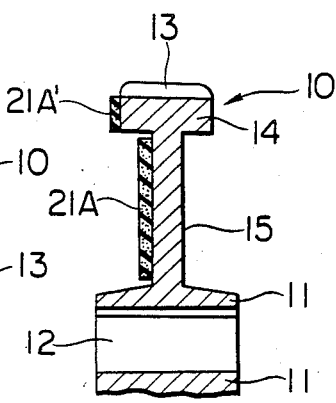

In FIGS. 1 and 2, there is shown a manner of attaching a permanent magnet on a gear made of a magnetizable material which is generally represented by 10. By magnetizable material is meant any material which is capable of being attracted by a magnet. The gear made of usual steel 10 has a hub portion 11 formed with a central bore 12 for the shaft not shown, exterior gear teeth 13 formed around a peripheral flange portion 14 and a web portion 15 extending between the hub 11 and the peripheral flange 14.

On one side of the web 14, a usual metallic permanent magnet 21A of the form corresponding to the web 15 is attached. Furthermore an annular magnet 21A' is attached on the same side of the flange 14.

Figure 3:
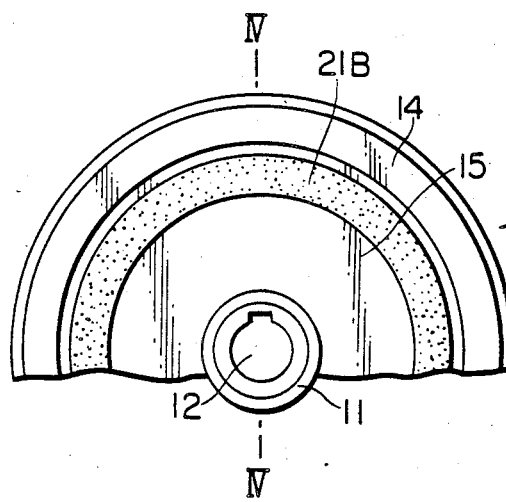
Figure 4:
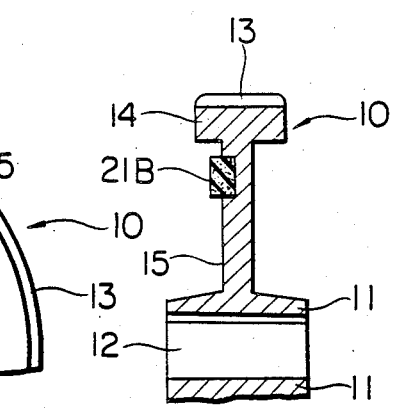

In FIGS. 3 and 4, another way of attachment of the magnet is shown. In this embodiment, an annular magnet 21B is attached on one side of the web 15 partly embedded in the recess correspondingly formed therein, as definitely shown in FIG. 4, a fragmentary sectional view taken along a line IV—IV in FIG. 3.

FIGS. 5 and 6, the latter being a sectional view taken along a line VI—VI in the former, showing the other manner of magnet attachment, wherein four permanent magnet 21C, each in the form of a sector, are attached on one side of the web 15 similarly partly embedded in the respective recess formed in the web and with a same angular space apart between every adjacent two sectoral magnets. The magnetic pole side of the magnet sheet is made reverse to that of the adjacent magnet.

FIG. 7 and 8, the latter being a sectional view taken along a line VIII—VIII in the former, show still other way of magnet attachment, in which the magnet 21A as illustrated in FIGS. 1 and 2 is attached on one side of the web 15. In this embodiment, however, said magnet 21A is covered with an elastomer sheet 22A so as to prevent the magnet 21A from being definitely removed from the gear due to severe mechanical condition but not to hinder free movement of the magnet necessary for damping the gear vibration, by fixing outer and inner peripheral edges of the sheet 22A onto the concerned portion of the gear 10.

Figure 9:
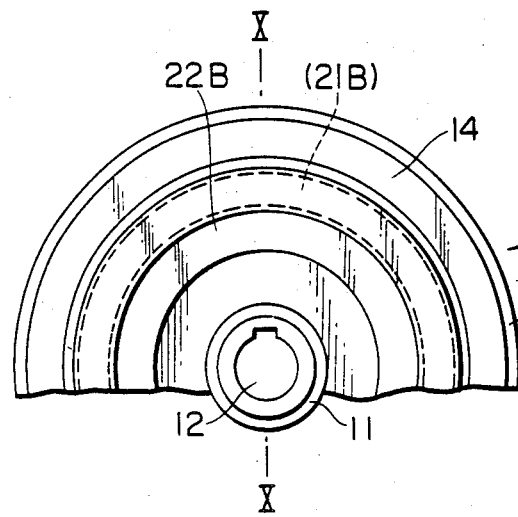
Figure 10:
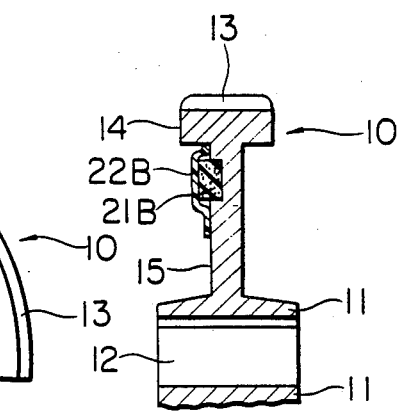

FIGS. 9 and 10, the latter being a sectional view taken along a line X—X in the former, show still other way of magnet attachment in which the annular magnet 21B as illustrated in FIGS. 3 and 4 is similarly partly embedded in the recess correspondingly formed in the gear web 15. The magnet 21B is covered with an annular sheet 22B of elastomer material with taking the above conditions into consideration.

Figure 11:
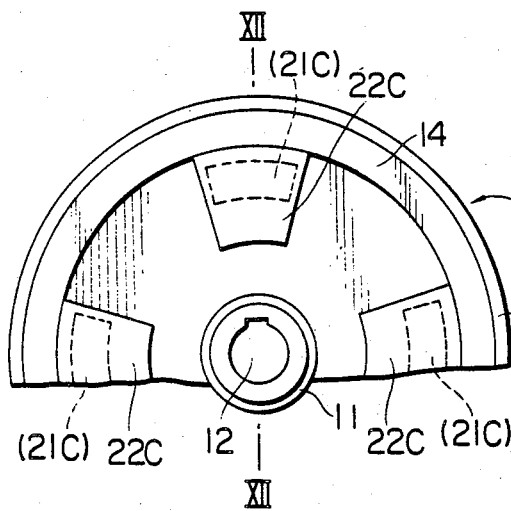
Figure 12:
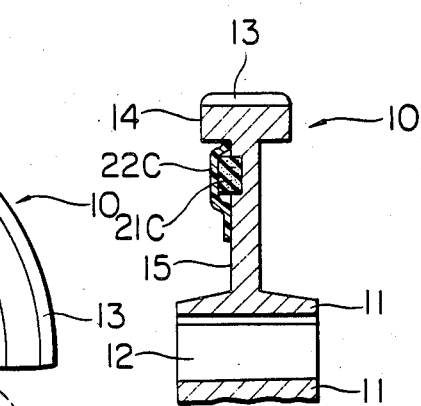

FIGS. 11 and 12, the latter being a sectional view taken along a line XII—XII in the former, illustrate a still further manner of magnet attachment according to the invention, in which four magnet 21C each in the form of sector are arranged as in FIG. 5 and attached on the web 15 partly embedded in the recess formed therein also as in FIG. 5. Each magnet 21C is covered with an elastomer sheet 22C with taking the conditions referred to the above into consideration.

In the foregoing embodiments, the magnet is attached only on one side of the gear, but it is possible to attach the magnet also on the reverse side.

The magnet may be any of usual ferrite magnet, plastic magnet and rubber magnet.

Figure 13:
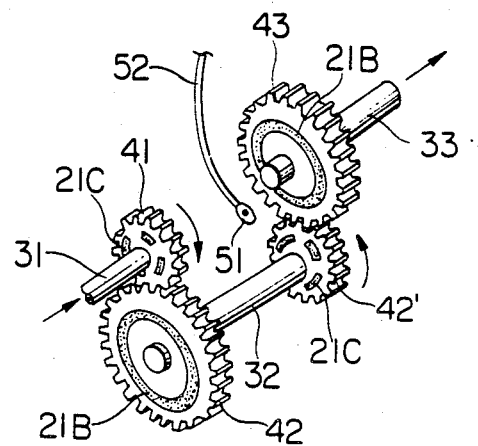
FIGS. 13 and 14 are respectively perspective views of gearings each gear being attached with a magnet according to the invention.

FIG. 13 shows a train of spur gears for reduction each attached with permanent magnet according to the invention.

On driving shaft 31, there is mounted a first spur gear 41, which is attached with four sector magnet 21C as illustrated in FIGS. 5 and 6. Second and third spur gears 42 and 42' are mounted on intermediate shaft 32 at the opposite end thereof so that said second spur gear 42 may mesh with said first gear 41. The second gear 42 is attached with the annular magnet 21B as shown in FIGS. 3 and 4 and the third gear 42' is attached with four sector magnet 21C. Fourth spur gear 43 is mounted on driven shaft 33 so as to mesh with said third gear 42' and attached with the annular magnet 21B as in FIGS. 3 and 4.

A microphone 51 is coupled with a noise measuring instrument not shown through a lead line. Noise of the gears attached with no magnet and noise of the gears attached with magnets as referred to above were measured of which results are shown in FIGS. 15A, 15B and 15C to be explained later.

Figure 14:
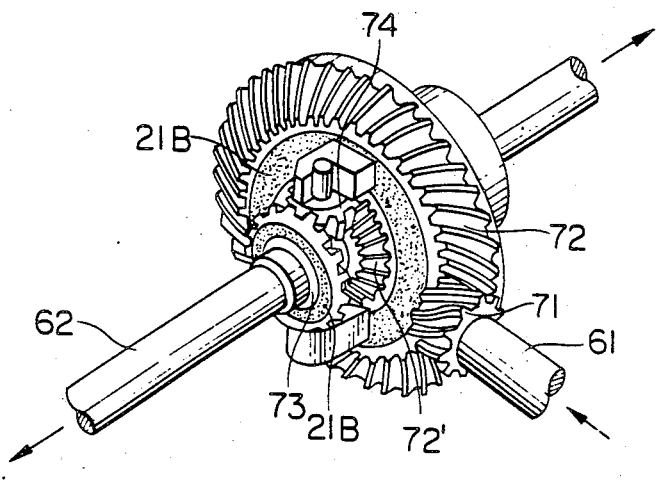

FIG. 14 shows a perspective view of other type of reduction gears on each of which the magnet is attached according to the invention. On driving shaft 61 there is mounted a helical pinion 71 which meshes with a skew bevel gear 72 which has small diameter of bevel gear teeth 72' formed at the hub portion thereof. On driving shaft 62 arranged to extend transverse to the direction of said driving shaft 61, there is mounted a bevel pinion 73 so as to mesh with an intermediate pinion 74 which in turn meshes with said bevel gear 72'.

As to such reduction gearings, annular magnet as in FIGS. 3 and 4 is attached on the web portion of the skew bevel gear 72 so as to surround the small bevel gear 72' and on the web of the bevel pinion 73.

Figure 15A:
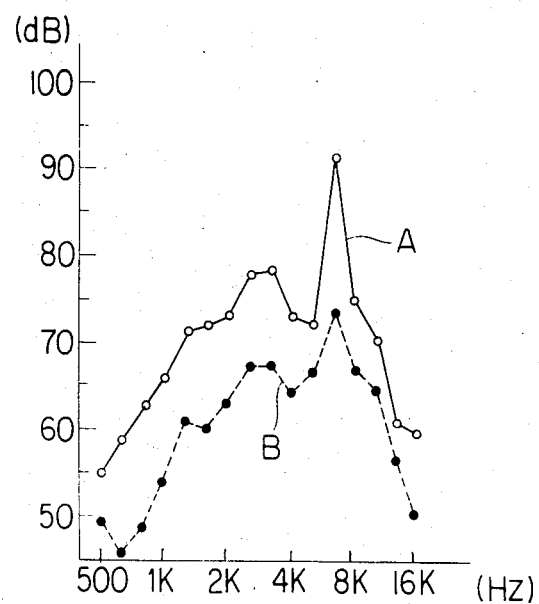
FIGS. 15A, 15B and 15C are graphs showing how far noise can be reduced according to the invention which was determined in respect of the gearings shown in FIG. 13.
Figure 15B:
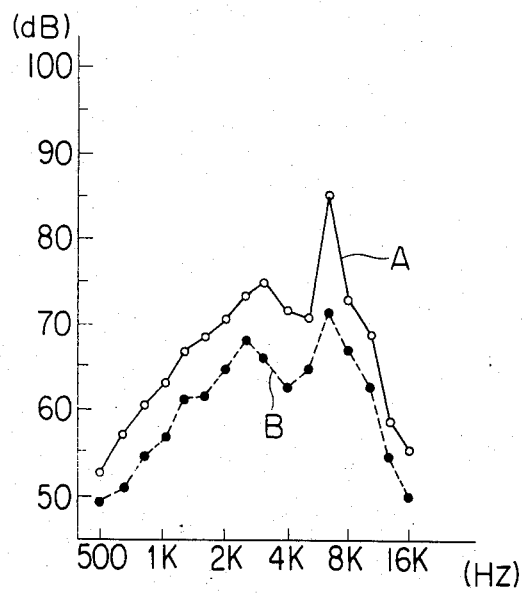
Figure 15C:
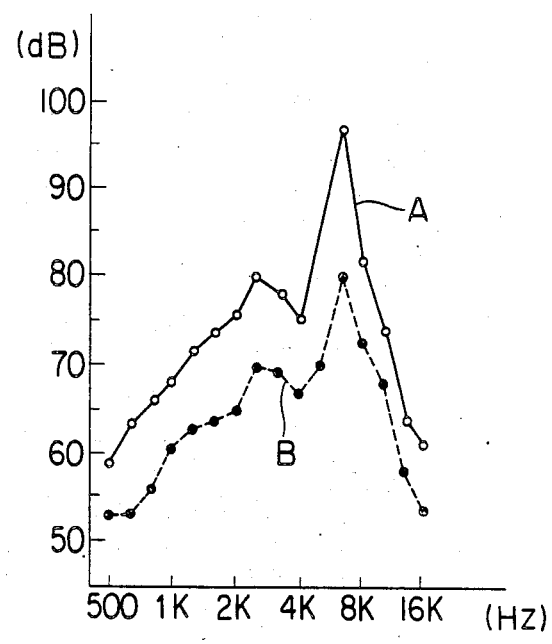

FIG. 15A shows results of the experiments made in respect of the gearings shown in FIG. 13. Along the ordinate acoustic pressure level (dB) is taken, while along the abscissa ⅓ octave band frequency (Hz) is taken.

Curve A relates to the result obtained from noise of gears attached with nothing and Curve B relates to that from gears each attached with magnet according to the invention as illustrated in respect of FIG. 13 respectively when the driving shaft 31 was rotated at 3,000 rpm.

It is noted that around the resonance frequency area where the acoustic pressure level shows the peak value, noise reduction was attained from about 90 dB down to about 70 dB, namely by about 20 dB. Even if taking the overall value it shows that noise reduction effect of more than 10 dB can be expected according to the invention.

FIGS. 15B and 15C are similar to FIG. 15A except that the input shaft was driven respectively at 1,500 rpm and 6,000 rpm instead of 3,000 rpm in FIG. 15A. The noise reduction effects are almost same.

What is claimed is:

1. A rotary element of magnetizable material having a hub and an outer edge disposed radially outwardly of said hub along with a web between said hub and said outer edge, said web having a side face which is disposed in a plane perpendicular to the axis of rotation of said rotary element, a permanent magnet held magnetically onto said side face such that under non-rotating conditions, said magnet is magnetically and fixedly retained and carried on and by said rotary element, said rotary element being adapted to be mounted on a shaft, said magnet being carried by said rotary element free and clear of and spaced from said shaft, said magnet directly contacting and directly abutting said side face free of any intermediate material between said side face and said magnet and providing for relative rotary movement between said magnet and said rotary element as said rotary element is continuously rotated, whereby said relative rotary movement provides dampening of vibration of said rotary element during continuous rotation of said rotary element.

2. A rotary element according to claim 1 wherein said rotary element has an annular groove, said magnet being disposed within said annular groove.

3. A rotary element according to claim 1, wherein said side face is disposed in a plane perpendicular to the axis of rotation of said rotary element.

4. A rotary element according to claim 1, wherein said magnet has a configuration of an annulus.

5. A rotary element according to claim 1, wherein said magnet has the configuration of a segment of an annulus.

6. A rotary element of magnetizable material having a hub and an outer edge disposed radially outwardly of said hub along with a web between said hub and said outer edge, said web having a side face which is disposed in a plane perpendicular to the axis of rotation of said rotary element, a permanent magnet held magnetically onto said side face such that under non-rotating conditions, said magnet is magnetically and fixedly retained and carried on and by said rotary element, said rotary element being adapted to be mounted on a shaft, said magnet being carried by said rotary element free and clear of and spaced from said shaft, said magnet directly contacting and directly abutting said side face free of any intermediate material between said side face and said magnet and providing for relative rotary movement between said magnet and said rotary element as said rotary element is continuously rotated, elastomer means disposed over said magnet, and affixing means affixing said elastomer means to said rotary element such that said relative rotary movement is not precluded by said elastomer means and said affixing means, whereby said relative rotary movement provides dampening of vibration of said rotary element during continuous rotation of said rotary element.

7. A gear wheel of magnetizable having a hub and gear teeth disposed radially outwardly of said hub along with a web between said hub and said gear teeth, said web having a side face which is disposed in a plane perpendicular to the axis of rotation of said gear wheel, a permanent magnet held magnetically onto said side face such that under non-rotating conditions, said magnet is magnetically and fixedly retained and carried on and by said gear wheel, said gear wheel being adapted to be mounted on a shaft, said magnet being carried by said gear wheel free and clear of and spaced from said shaft, said magnet directly contacting and directly abutting said side face free of any intermediate material between said side face and said magnet and providing for relative rotary movement between said magnet and said gear wheel as said gear wheel is continuously rotated, elastomer means disposed over said magnet, and affixing means affixing said elastomer means to said gear wheel such that said relative rotary movement is not precluded by said elastomer means and said affixing means, whereby said relative rotary movement provides dampening of vibration of said gear wheel during continuous rotation of said gear wheel.

8. A rotary element according to claim 1, wherein said gear wheel has a radially outer enlarged portion on which said gear teeth are formed, said magnet being disposed on said enlarged portion.

* * * * *